April 7, 1970    E. HIRYCH    3,504,951
ENDLESS TRACK
Filed Aug. 28, 1968
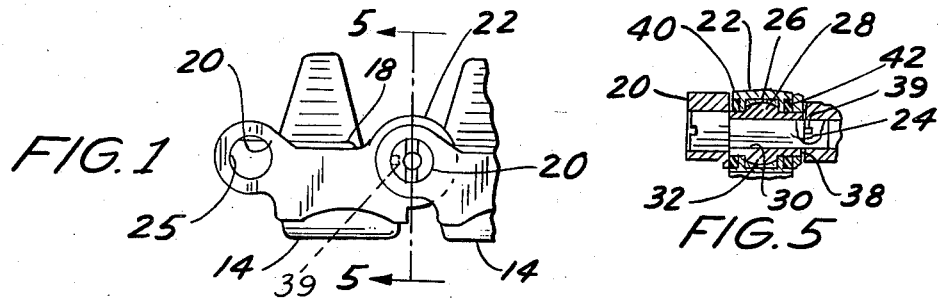
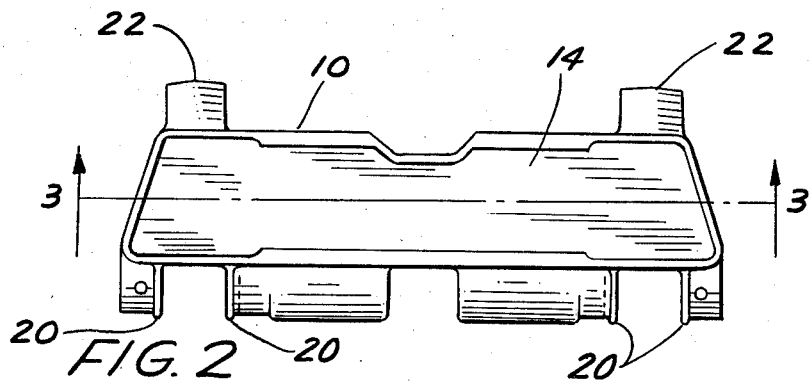
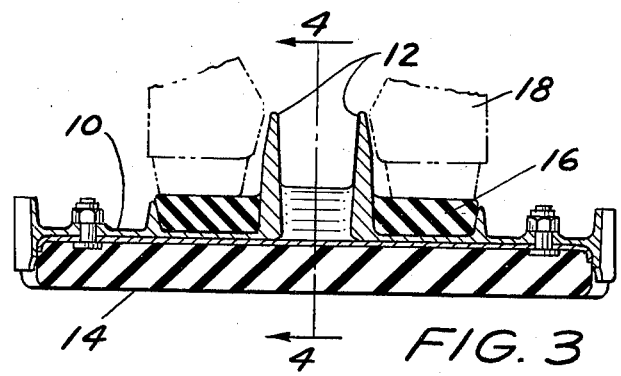
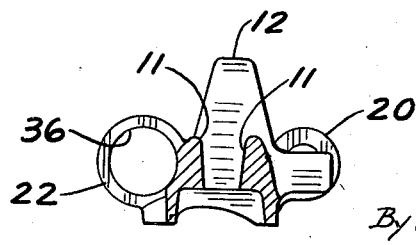
EDWARD HIRYCH
INVENTOR.
By: Harry M. Saragovitz
Edward J. Kelly
Herbert Berl and
John J. Swartz
ATTORNEYS

# United States Patent Office 3,504,951
Patented Apr. 7, 1970

3,504,951
ENDLESS TRACK
Edward Hirych, Rochester, Mich., assignor, by mesne assignments, to the United States of America as represented by the Secretary of the Army
Filed Aug. 28, 1968, Ser. No. 755,873
Int. Cl. B62d 55/28
U.S. Cl. 305—11  5 Claims

ABSTRACT OF THE DISCLOSURE

An endless track including pairs of track shoes articulately connected with each adjacent shoe by pairs of hinges each of which includes a spherical bearing.

This invention relates to an endless track and more particularly to the means by which adjacent track shoes are articulately connected.

Endless tracks are commonly employed on military tanks and other similar commercial vehicles to provide increased traction under adverse soil conditions. These tracks are commonly driven by one or more sprockets on which each track is mounted. The track includes a series of articulated track shoes which are pivotally connected with each other in many different fashions.

Bearing systems for endless tracks commonly include either hard surface bearings or rubber bushings. Rubber bushings have been the most common of the two types due to the inherent problems associated with hard surface bearings as will be described hereinafter.

Rubber bushings have proved unsatisfactory because of the inherent flexibility and stretch associated therewith. Systems employing these bushings commonly "jump the track" due to their elasticity. Moreover, the power loss associated with these bushings is very high.

Hard surface bearings have been considered to eliminate the above mentioned problems associated with rubber bearings and have generally consisted of journaled bearings surrounding the track pin. Track type vehicles are subjected to extreme loads and vibrations which are transmitted to the bearing members. These loads present extreme loading in both the radial and axial directions. Due to their construction, journaled bearings are incapable of absorbing the thrust loads due to canting of the bearings from the extreme loads. This misalignment causes the journaled bearings to be unevenly loaded and hence wear rapidly at the points of maximum stress, generally at the inner and outer edges of the bearing. This problem is further aggravated by the improper sealing of this type bearing when the track shoes are pivoted with respect to each other.

A new and improved construction according to the invention provides for increased track life by the elimination of bearing wear with uniform loading. This invention provides for an endless track having a plurality of track shoes connected together by pairs of hinges. Each hinge is formed with a single collar which is rigidly connected with one shoe and rotatably connected between a pair of collars from the adjacent shoe. A track pin for each hinge is rigidly connected on the track pin intermediate each pair of collars. An outer race of the spherical bearing surrounds each of the inner race in bearing relation thereto. An outer race is connected to each of the single collars. Uneven loading causing deflection of the track shoes and pins is uniformly distributed by the spherical bearing.

Other advantages of the present invention will become apparent to those of ordinary skill in the art by the following description when considered in relation to the accompanying drawing of which:

FIGURE 1 is a side elevational view of a portion of the endless track showing two track pads articulately connected.

FIGURE 2 is a plan view of one of the track shoes of the endless track.

FIGURE 3 is a cross sectional view of the track shoe taken along lines 3—3 of FIGURE 2.

FIGURE 4 is a cross sectional view through the center of the track shoe frame taken along lines 4—4 of FIGURE 3.

FIGURE 5 is a cross sectional view of the bearing assembly taken through lines 5—5 of FIGURE 1.

Referring now to the drawing wherein similar numerals will refer to similar parts in the various figures, each track shoe of the endless track includes a yoke showing generally at 10 including a sprocket engaging portion 11 and a pair of center guides 12 to guide the track shoes about the sprockets, not shown. Yoke 10 is a single piece alloy steel casting. Secured to the yoke by bolts are a removable road pad 14 and a pair of road wheel pads 16 mounted on opposite sides of the center guide. Pad 14 is mounted on the outside of the track and engages the surface to be traversed. One or more road wheels, shown in phantom at 18, may be provided on opposite sides of the center guides to engage the road wheel pad in a manner dependent upon the type of track suspension desired. Yoke 10 also has a pair of spaced apart collars on each lateral edge of one longitudinal extremity of the yoke. Mounted along the opposite longitudinal extremity of yoke 10 are single individual collars 22. Each individual collar 22 of one shoe is pivotally connected between a pair of spaced apart collars 20 of an adjacent shoe.

Adjacent track shoes are articulately connected by pairs of hinges as can best be seen in FIGURE 5. A hinge pin 24 is rigidly connected with the bore 25 formed in each pair of spaced apart collars 20. Mounted between the single collar 22 and the track pin 24 which is connected to each pair of spaced apart collars is a spherical bearing comprising an outer race 26 and an inner race 28. The bearing interface is a spherical surface. The spherical bearing transmits both tension and side loading while providing an easily flexible dimensionally stable joint. The inner race comprises a collar including a cylindrical bore 30 therethrough and a convex outer surface 32 which is spherically shaped. The outer race 26 includes a concave surface 34 which is complementary with the spherical convex surface 32 of the inner race. Outer race 26 is rigidly connected with the inner surface 36 of collar 22 whereas inner race 28 is rigidly connected relative to pin 24 in a manner which will be described hereinafter. The huge pins are used to transmit both tension and side loads from collars 20 to the bearing inner race 28. Since all torque loads created by bearing friction are transmitted directly to the shoe by the inner race itself, the pin locking required is that which is necessary to prevent the pin from shaking free. The locking may be effected by a roll pin passing through a hole (not shown) formed in collars 20 and pin 28.

Disposed on either side of the spherical bearing assembly are a pair of circumferential flanges 28 connected with the inner race 28. A pair of circumferential flanges 40 extend axially parallel to the inner flanges 38. A ring seal 42 compressively engages the inner and outer flanges 34 and 40 to prevent dirt and other extraneous matter from interfering between the inner and outer races 26 and 28. In prior art devices, the sealing was effected directly on the track pin. Flange 38 forms a convenient support for seal 42 without causing deterioration of the seal when the adjacent track shoes rotate relative to each other. Moreover, this provides the capability of track separation without disturbing the seals of the bearing.

A lug 39 as shown in FIGURE 5 is formed on the end of one of the flanges 38 and extends axially into a complementary recess formed in its associated collar 20. The lug 39 may be of short circumferential extent relative to flange 38. Lug 39 serves to secure the inner race 28 against rotation relative to pin 24 since pin 24 is rigidly secured to collars 20. Lug 39 permits the transfer of all torque which is transmitted through the bearing interface directly to the yoke 10. Without this feature, inner race 28 would have to be locked to yoke 10, through hinge pin 24 which generally has the undesirable result of pin 24 moving relative to race 28.

In operation, when the endless track is subjected to external forces, the hinge pin 24 will be canted due to non-uniform loading. Such pin misalignment could be also due to machine errors. When the pin is thus canted, the inner and outer spherically shaped races 26 and 28 merely rotate relative to each other without creating load concentrations within the bearing. The inner and outer races are able to adjust relative to one another with uniform loading, thereby eliminating stress concentrations. Due to the bearing relation between the inner and outer races 26 and 28, the spherical bearing assembly is able to absorb thrust loads, thereby eliminating the necessity of thrust bearings which are commonly used in similar systems. If for some reason it is desired to separate individual track shoes, the two pins 24 between each pair of track shoes may be removed without disturbing the bearing or seals. This due of course to the race 38 supporting the seals 42 and thus the spherical bearing assembly remains free of foreign matter even though the track pins are removed.

What has been described therefore is an improved track design utilizing spherical bearings that minimize load concentrations by adjusting to shoe deflections, seals that remain undisturbed when changing shoes, and a lug to prevent relative rotation of the inner bearing race and hinge pin to prevent detrimental play therebetween.

Since it is obvious that many changes and modifications can be made to the above described details without departing from the nature and spirit of the invention, it is to be understood that the invention is not limited to said details except as set forth in the appended claims.

I claim:

1. An endless track having a plurality of track shoes each comprising a yoke including a guide portion, a sprocket engaging portion, a pair of spaced apart collars on each lateral edge of one longitudinal extremity of said yoke, and a single collar on each lateral edge of the other longitudinal extremity of said yoke, adjacent track shoes being articulately connected by pairs of hinges comprising:
    a spherical bearing including an inner race and an outer race, and
    a hinge pin rigidly connected with each pair of said spaced apart collars and said inner race,
    said outer race of said spherical bearing mounted about said inner race in bearing relation thereto,
    one of said single collars from the next adjacent track shoe rigidly mounted to said outer race intermediate each of said pairs of spaced apart collars.

2. An endless track as set forth in claim 1 wherein:
    said inner race comprises:
        a collar having a cylindrical bore therethrough and a convex outer surface, and
    said outer race comprises:
        a sleeve having a concave inner surface complementary with said outer surface of said inner race,
    said inner race being rigidly secured relative to said pin.

3. An endless track as set forth in claim 2 wherein said inner race is rigidly secured relative to pin by means of a lug extending axially into a complementary recess formed in one of said spaced apart collars.

4. An endless track as set forth in claim 1 wherein said inner race comprises axially extending flanges extending along said pin on either side of each of said inner races and each of said single collars comprise an axially extending flange in parallel spaced relation with each of said flanges included in said inner race.

5. An endless track as set forth in claim 4 wherein a ring seal is mounted on opposite sides of each of said spherical bearings in compressive engagement with said single collar and the flanges on said inner race.

References Cited

UNITED STATES PATENTS

| | | | |
|---|---|---|---|
| 1,678,149 | 7/1928 | Lamb | 305—58 X |
| 3,092,423 | 6/1963 | Speidel | 305—11 |
| 2,563,848 | 8/1951 | Knox | 305—59 X |
| 3,463,560 | 8/1969 | Reinsma | 305—11 |

RICHARD J. JOHNSON, Primary Examiner

U.S. Cl. X.R.

305—58